US008411079B2

(12) United States Patent
Miyazawa

(10) Patent No.: US 8,411,079 B2
(45) **Date of Patent: *Apr. 2, 2013**

(54) UNIT CIRCUIT, CONTROL METHOD THEREOF, ELECTRONIC DEVICE, ELECTRO-OPTICAL DEVICE, AND ELECTRONIC APPARATUS

(75) Inventor: Takashi Miyazawa, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

This patent is subject to a terminal disclaimer.

(21) Appl. No.: 12/760,621

(22) Filed: Apr. 15, 2010

(65) Prior Publication Data

US 2010/0194740 A1 Aug. 5, 2010

Related U.S. Application Data

(63) Continuation of application No. 11/279,823, filed on Apr. 14, 2006, now Pat. No. 7,728,828.

(30) Foreign Application Priority Data

Apr. 14, 2005 (JP) ................................. 2005-117132

(51) Int. Cl.
*G06F 3/038* (2006.01)
*G09G 3/30* (2006.01)
*G09G 5/00* (2006.01)

(52) U.S. Cl. ........................... 345/214; 345/76; 345/204

(58) Field of Classification Search .................. 345/204, 345/214, 76–77, 82; 257/59
See application file for complete search history.

(56) References Cited

U.S. PATENT DOCUMENTS

| | | | | |
|---|---|---|---|---|
| 6,229,508 | B1 * | 5/2001 | Kane | 345/82 |
| 7,259,593 | B2 * | 8/2007 | Miyazawa | 326/83 |
| 7,259,737 | B2 | 8/2007 | Ono et al. | |
| 7,728,828 | B2 * | 6/2010 | Miyazawa | 345/204 |
| 7,944,416 | B2 * | 5/2011 | Ono et al. | 345/77 |
| 2004/0246212 | A1 | 12/2004 | Kobayashi et al. | |
| 2004/0252089 | A1 * | 12/2004 | Ono et al. | 345/82 |
| 2005/0057459 | A1 | 3/2005 | Miyazawa | |

(Continued)

FOREIGN PATENT DOCUMENTS

| | | | |
|---|---|---|---|
| CN | 1551084 | A | 12/2004 |
| JP | A-2002-514320 | | 5/2002 |

(Continued)

OTHER PUBLICATIONS

You et al.; "P-14: Polarity Balanced Driving to Reduce VTH Shift in a-Si for Active Matrix OLEDs"; *SID 04 Digest*; SID Symposium Digest of Technical Papers; Society for Information Display; vol. 35; May 2004; pp. 272-275.

*Primary Examiner* — Bipin Shalwala
*Assistant Examiner* — Matthew Fry
(74) *Attorney, Agent, or Firm* — Oliff & Berridge, PLC

(57) ABSTRACT

A unit circuit includes a capacitive element having a first electrode, a second electrode, and a dielectric layer; a transistor having a gate electrode connected to the first electrode, a first terminal, and a second terminal connected to a driven element; a first switching element controlling electrical connection between the gate electrode of the transistor and the second terminal; and a second switching element connected to the second electrode. A potential of the first electrode is set to a predetermined potential higher by a threshold voltage of the transistor than a first potential by turning on the first switching element, and the potential of the first electrode is set to the first potential by supplying a first operation signal to the second electrode through the turned-on second switching element in a state that the first electrode is electrically isolated from the predetermined potential by turning off the first switching element.

6 Claims, 9 Drawing Sheets

RESET PERIOD (3)

U.S. PATENT DOCUMENTS

| | | | | |
|---|---|---|---|---|
| 2005/0083270 | A1 | 4/2005 | Miyazawa | |
| 2006/0176250 | A1* | 8/2006 | Nathan et al. | 345/76 |
| 2007/0046592 | A1 | 3/2007 | Ono et al. | |
| 2008/0007547 | A1 | 1/2008 | Hasumi et al. | |

FOREIGN PATENT DOCUMENTS

| | | |
|---|---|---|
| JP | A-2006-215296 | 8/2006 |
| WO | WO 98/48403 A1 | 10/1998 |

* cited by examiner

INITIALIZATION PERIOD (1)

UNIT CIRCUIT, CONTROL METHOD THEREOF, ELECTRONIC DEVICE, ELECTRO-OPTICAL DEVICE, AND ELECTRONIC APPARATUS

CROSS-REFERENCE TO RELATED APPLICATIONS

This is a Continuation of application Ser. No. 11/279,823 filed Apr. 14, 2006. This application also claims priority to Japanese Patent Application No. 2005-117132, filed on Apr. 14, 2005. The disclosure of the prior applications is hereby incorporated by reference herein in its entirety.

BACKGROUND

The present invention relates to a unit circuit suitable for driving a driven element or an electronic element such as an organic light emitting element and a liquid crystal element, a control method thereof, an electronic device such as an electro-optical device, and an electronic apparatus.

Generally, transistors are used for driving electro-optical elements such as liquid crystal elements and organic light emitting diodes (hereinafter, properly abbreviated as "OLED elements"). It is necessary to precisely control the transistors for enhancement in performance and increase of the number of gray scales.

In the past, low-temperature polysilicon (LTPS) transistors were used as such driving transistors. In recent years, amorphous silicon transistors attracted attentions as such driving transistors, because they can be measured with low cost and can easily accomplish uniform characteristics. However, when a voltage having the same polarity such as a positive voltage or a negative voltage is continuously applied to a gate electrode of an amorphous silicon transistor, it is known that the threshold voltage thereof varies. The brightness of the corresponding OLED element varies due to variation in threshold voltage, thereby deteriorating display quality.

This is because the characteristics vary due to influence of accumulated carriers or the like when the carriers are continuously supplied to the transistor. This tendency is remarkable specifically when the amorphous silicon transistor is used as a driving transistor. In order to stabilize the characteristics, there has been suggested a technology of first applying a positive voltage to a gate electrode of a driving transistor and then applying a negative voltage thereto (for example, see "Polarity-Balanced Driving to Reduce VTH Shift in a-Si for Active-Matrix OLEDs", written by Bong-Hyun You et al., SID Symposium Digest of Technical Papers, USA, Society for Information Display, May in 2004, vol. 35, Chap. 1, pp 272-275 (see FIGS. 3A and 3B)).

However, in the technology, since two driving transistors are required and two capacitive elements are required to correspond to each driving transistor, there is a problem in that the circuit configuration is complex. Specifically, when the number of circuit elements such as transistors and capacitive element increases, the circuit area increases and the aperture ratio decreases.

In the technology, since a negative voltage to be applied to the gate electrode of the driving transistor is supplied independently of the positive voltage, the circuit configuration is complex and a dynamic voltage range is widened. Accordingly, there is a problem in that burden on the circuit or power consumption increases. In addition, current flowing through an OLED is affected by the threshold voltage of the driving transistor.

SUMMARY

An advantage of the present invention is to provide a unit circuit in which a negative voltage can is applied to a transistor without influence of the threshold voltage on current flowing through the transistor with a simple configuration, when the transistor is used as a driving transistor of a driven element, a control method thereof, an electronic device, an electro-optical device, and an electronic apparatus.

According to an aspect of the invention, there is provided a unit circuit comprising: a capacitive element having a first electrode, a second electrode, and a dielectric layer interposed between the first electrode and the second electrode; a transistor having a gate electrode connected to the first electrode, a first terminal supplied with one of a low potential and a high potential, and a second terminal connected to a driven element; a first switching element controlling electrical connection between the gate electrode of the transistor and the second terminal; and a second switching element connected to the second electrode. A potential of the first electrode is set to a predetermined potential higher by a threshold voltage of the transistor than a first potential by turning on the first switching element, and the potential of the first electrode is set to the first potential by supplying a first operation signal to the second electrode through the turned-on second switching element in a state that the first electrode is electrically isolated from the predetermined potential by turning off the first switching element. A second period in which the potential of the first electrode is set to the predetermined potential by turning on the first switching element and a second operation signal is supplied to the second electrode through the turned-on second switching element is provided subsequently to a first period in which the potential of the first electrode is set to the first potential. In a state that the first electrode is electrically isolated from the predetermined potential by turning off the first switching element after the second period is ended, the potential of the first electrode is set to a second potential by supplying a third operation signal to the second electrode through the turned-on second switching element. Here, the first potential and the second potential have opposite polarities when the predetermined potential is used as a reference potential.

According to another aspect of the invention, there is provided a unit circuit comprising: a capacitive element having a first electrode, a second electrode, and a dielectric layer interposed between the first electrode and the second electrode; a transistor having a gate electrode connected to the first electrode, a first terminal supplied with one of a low potential and a high potential, and a second terminal connected to a driven element; a first switching element controlling electrical connection between the gate electrode of the transistor and the second terminal; and a second switching element connected to the second electrode. A potential of the first electrode is set to a predetermined potential higher by a threshold voltage of the transistor than the low potential by turning on the first switching element in a state that the low potential is applied to the first terminal, and the potential of the first electrode is set to a first potential by supplying a first operation signal to the second electrode through the turned-on second switching element in a state that the first electrode is electrically isolated from the predetermined potential by turning off the first switching element. A second period in which the potential of the first electrode is set to the predetermined potential by turning on the first switching element and a second operation signal is supplied to the second electrode through the turned-on second switching element is provided subsequently to a first period in which the potential of the first electrode is set to the first potential. In a state that the first electrode is electrically isolated from the predetermined potential by turning off the first switching element after the second period is ended, the potential of the first electrode is set to a second potential by supplying a third operation signal to the second electrode through the turned-on second switching element. Here, the first potential and the second potential have opposite polarities when the predetermined potential is used as a reference potential.

In the aspect of the invention described above, in the first period, the potential of the gate electrode of the transistor is set to a predetermined potential in consideration of a threshold voltage and then the potential of the gate electrode is set to the first potential by the use of capacitive coupling. When the current flowing in the transistor is Ids, the gate-source voltage is Vgs, and the threshold voltage is Vth, the following expression is obtained: $Ids=1/2\beta(Vgs-Vth)^2$, where β is a constant. Accordingly, by changing the potential supplied to the second electrode in the state that the second switching element is turned on, it is possible to cancel the threshold value Vth.

Since the first switching element and the second switching element are turned on in the second period, the gate electrode of the transistor connected to the first electrode of the capacitive element is set to the predetermined potential and the second operation signal is supplied to the second electrode of the capacitive element. As a result, a potential difference is generated between both ends of the capacitive element. When the second period is ended and then the first switching element is turned off, the gate electrode of the transistor is in the floating state. In this state, the third operation signal is supplied to the second electrode of the capacitive through the second switching element. Then, the potential of the first electrode of the capacitive element is changed with the potential difference maintained. Here, the potential of the first electrode is set to the second potential having a polarity opposite to the first potential when the predetermined potential is used as a reference potential. Consequently, according to the invention, it is possible to apply the first potential and the second potential having different polarities to the gate electrode of the transistor with a simple configuration of two switching elements and one capacitive element. Here, when the first to third operation signals supplied to the second switching element are one of a positive potential and a negative potential relative to the predetermined potential, the positive potential and the negative potential can be applied to the gate electrode of the transistor. Accordingly, the dynamic voltage range of the operation signals can be reduced. As a result, it is possible to reduce circuit burdens. In addition, since the positive potential and the negative potential are applied to the gate electrode of the transistor, it is possible to suppress the variation in threshold voltage due to influence of carriers accumulated by continuously supplying the carriers to the transistor. Specifically, since an amorphous silicon transistor has large variation in threshold voltage resulting from supplying of the carriers in one direction, the invention is more effective for employing the amorphous silicon transistor. The first period and the second period are not necessarily subsequent to each other, and a margin may be disposed therebetween.

In the unit circuit, the first potential may be higher than the predetermined potential and the second potential may be lower than the predetermined potential. In the unit circuit, the potentials of the first operation signal and the second operation signal may be different from each other, but it is preferable that the first operation signal and the second operation signal have the same potential. In this case, the potential difference between the predetermined potential and the second potential and the potential difference between the predetermined potential and the second potential can be set to be equal to each other.

According to another aspect of the invention, there is provided a method of controlling a unit circuit comprising: a capacitive element having a first electrode, a second electrode, and a dielectric layer interposed between the first electrode and the second electrode; a transistor having a gate electrode connected to the first electrode, a first terminal supplied with one of a low potential and a high potential, and a second terminal connected to a driven element; a first switching element controlling electrical connection between the gate electrode of the transistor and the second terminal; and a second switching element connected to the second electrode. The method comprises: setting a potential of the first electrode to a predetermined potential higher by a threshold voltage of the transistor than the low potential by turning on the first switching element to set a potential of the first terminal; setting the potential of the first electrode to a first potential by supplying a first operation signal to the second electrode through the turned-on second switching element in a state that the first electrode is electrically isolated from the predetermined potential by turning off the first switching element; supplying a second operation signal to the second electrode through the turned-on second switching element in a state that the potential of the first electrode is set to the predetermined potential by turning on the first switching element after a period in which the potential of the first electrode is set to the first potential; and setting the potential of the first electrode to a second potential by supplying a third operation signal to the second electrode through the turned-on second switching element in a state that the first electrode is electrically isolated from the predetermined potential by turning off the first switching element. Here, the first potential and the second potential have opposite polarities when the predetermined potential is used as a reference potential.

In the aspect of the invention described above, it is possible to apply the first potential and the second potential having different polarities to the gate electrode of the transistor with a simple configuration of two switching elements and one capacitive element. In this case, since the first to third operation signals are supplied to the gate electrode of the transistor by the use of capacitive coupling, the dynamic voltage range can be reduced. As a result, it is possible to reduce the circuit burden. In addition, it is possible to suppress the variation in characteristics of the transistor. Specifically, since an amorphous silicon transistor has large variation in threshold voltage resulting from supplying of the carriers in one direction, the invention is more effective for employing the amorphous silicon transistor.

According another aspect of the invention, there is provided an electronic device comprising a plurality of first signal lines, a plurality of second signal lines, a plurality of power supply lines supplied with one of a low potential and a high potential, and a plurality of unit circuits. Each unit circuit comprises: a capacitive element having a first electrode, a second electrode, and a dielectric layer interposed between the first electrode and the second electrode; a transistor having a gate electrode connected to the first electrode, a first terminal supplied with one of the plurality of power supply lines, and a second terminal connected to a driven element; a first switching element controlling electrical connection between the gate electrode of the transistor and the second terminal; and a second switching element connected to the second electrode. A potential of the first electrode is set to a predetermined potential higher by a threshold voltage of the transistor than the low potential by turning on the first switching element to electrically connect the gate electrode and the second terminal of the transistor to each other in a state that the low potential is supplied to the first terminal through the power supply line, and the potential of the first electrode is then set to the first potential by supplying a first operation signal to the second electrode through the turned-on second switching element in a state that the first electrode is electrically isolated from the predetermined potential by turning off the first switching element. A second period in which the potential of the first electrode is set to the predetermined potential by turning on the first switching element and a second operation signal is supplied to the second electrode through the turned-on second switching element is provided subsequently to a first period in which the potential of the first electrode is set to the first potential. In a state that the first electrode is electrically isolated from the predetermined potential by turning off the first switching element after the second period is ended, the potential of the first electrode is set to a second potential by supplying a third operation signal to the second electrode through the turned-on second switching element.

In the electronic device described above, different potentials such as the first potential and the second potential can be applied to the gate electrode of the transistor. Here, the one of the plurality of power supply lines may be set to the predetermined potential and the first potential and the second potential may have opposite polarities when the predetermined potential is used as a reference potential.

According to another aspect of the invention, there is provided an electro-optical device having a plurality of scanning lines, a plurality of data lines, and a plurality of pixel circuits disposed to correspond to intersections between the plurality of scanning lines and the plurality of data lines. The electro-optical device comprises: a scanning-line driving circuit driving the plurality of scanning lines; and a data-line driving circuit for supplying data signals to the plurality of data lines and the plurality of scanning lines include a plurality of first control lines and a plurality of second control lines. Here, each pixel circuit comprises: an electro-optical element; a transistor having a first terminal supplied with one of a low potential and a high potential and a second terminal connected to the electro-optical element; a capacitive element of which one end is connected to a gate electrode of the transistor; a first switching element which is disposed between the gate electrode and the second terminal of the transistor, which is controlled by a first control signal supplied through one of the plurality of first control lines, and which connects the gate electrode and the second terminal of the transistor in a state that the low potential is applied to the first terminal; and a second switching element which is disposed between the other end of the capacitive element and the corresponding data line, which is controlled by a second control signal supplied through one of the plurality of second control lines, and which supplies the data signals to the other end of the capacitive element.

In the aspect of the invention described above, it is possible to apply the potentials having different polarities to the gate electrode of the transistor by properly controlling the first and second switching elements with a simple configuration of two switching elements and one capacitive element. Since the potential of the gate electrode controlled by the use of capacitive coupling, it is possible to reduce the dynamic voltage range. As a result, it is possible to reduce the circuit burden. In addition, it is possible to suppress the variation in characteristics of the transistor. Specifically, since an amorphous silicon transistor has large variation in threshold voltage resulting from supplying of the carriers in one direction, the invention is more effective for employing the amorphous silicon transistor.

More specifically, in an initialization period, the scanning-line driving circuit may generate the first control signal and the second control signal so as to turn on the first switching element and the second switching element and the data-line driving circuit may set the level of the data signal to a reference potential. In an operation period subsequent to the initialization period, the scanning-line driving circuit may generate the first control signal and the second control signal so as to turn off the first switching element and turn on the second switching element, the data-line driving circuit may set the level of the data signal to a first operation potential which is changed by a positive voltage corresponding to brightness of the electro-optical element from the reference potential, and then the scanning-line driving circuit may generate the first control signal and the second control signal so as to turn off the first switching element and the second switching element. In a reset period subsequent to the operation period, the scanning-line driving circuit may generate the first control signal and the second control signal so as to turn on the first switching element and the second switching element and the data-line driving circuit may set the level of the data signal to a second operation potential. In a recovery period subsequent to the reset period, the data-line driving circuit may set the level of the data signal to the reference potential in a state that the scanning-line driving circuit generates the first control signal and the second control signal so as to turn off the first switching element and turn on the second switching element, and then the scanning-line driving circuit may generate the second control signal so as to turn off the second switching element.

According to the configuration described above, the potentials of both ends of the capacitive element is initialized in the initialization period. At this time, a predetermined potential higher by the threshold voltage of the transistor than the low voltage is applied to one end of the capacitive element. In the operation period, one end of the capacitive element is in the floating state and the potential of the other end is increased by a positive voltage. Then, the potential of one end of the capacitive element is increased by a positive voltage from the predetermined voltage. Thereafter, since the operation potential is maintained by the gate capacitance of the transistor even when the second switching element is turned off, the transistor maintains the ON state. In the reset period, since the predetermined potential is applied to the gate electrode of the transistor, the transistor is turned off. A potential difference is generated between both ends of the capacitive element. In the recovery period, the gate electrode of the transistor is changed to the floating state and the potential of the other end of the capacitive element is decreased to the reference potential from the operation potential. Accordingly, the potential of one end of the of the capacitive element drops and it is thus possible to apply the negative voltage to the gate electrode of the transistor. Here, the electro-optical element is an element of which the optical characteristic can be controlled by means of electrical operations. Examples of the electro-optical element can include an organic light emitting diode or an inorganic light emitting diode.

According to the configuration of the invention described above, since the negative voltage can be applied to the gate electrode of the transistor only by supplying the positive voltage from the second switching element, it is not necessary to externally supply the negative voltage to the pixel circuits and thus it is not necessary to widen the dynamic voltage range. Accordingly, the circuit design is facilitated and the power consumption cannot be increased. In addition, since the negative voltage can be applied to the gate electrode of the transistor for driving the electro-optical device, the variation in characteristics of the transistor is suppressed. Specifically, since the variation in characteristics of the amorphous silicon transistor is suppressed, it is possible to suppress the variation in brightness of the electro-optical element and to maintain high display quality. Since the circuit configuration for applying the negative voltage to the transistor is simple, it is possible to suppress the decrease in aperture ratio.

According to another aspect of the invention, there is provided an electronic apparatus comprising the electro-optical device. Examples of the electronic apparatus can include a large-sized display apparatus in which a plurality of panels are connected, a personal computer, a mobile phone, and a personal digital assistant.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
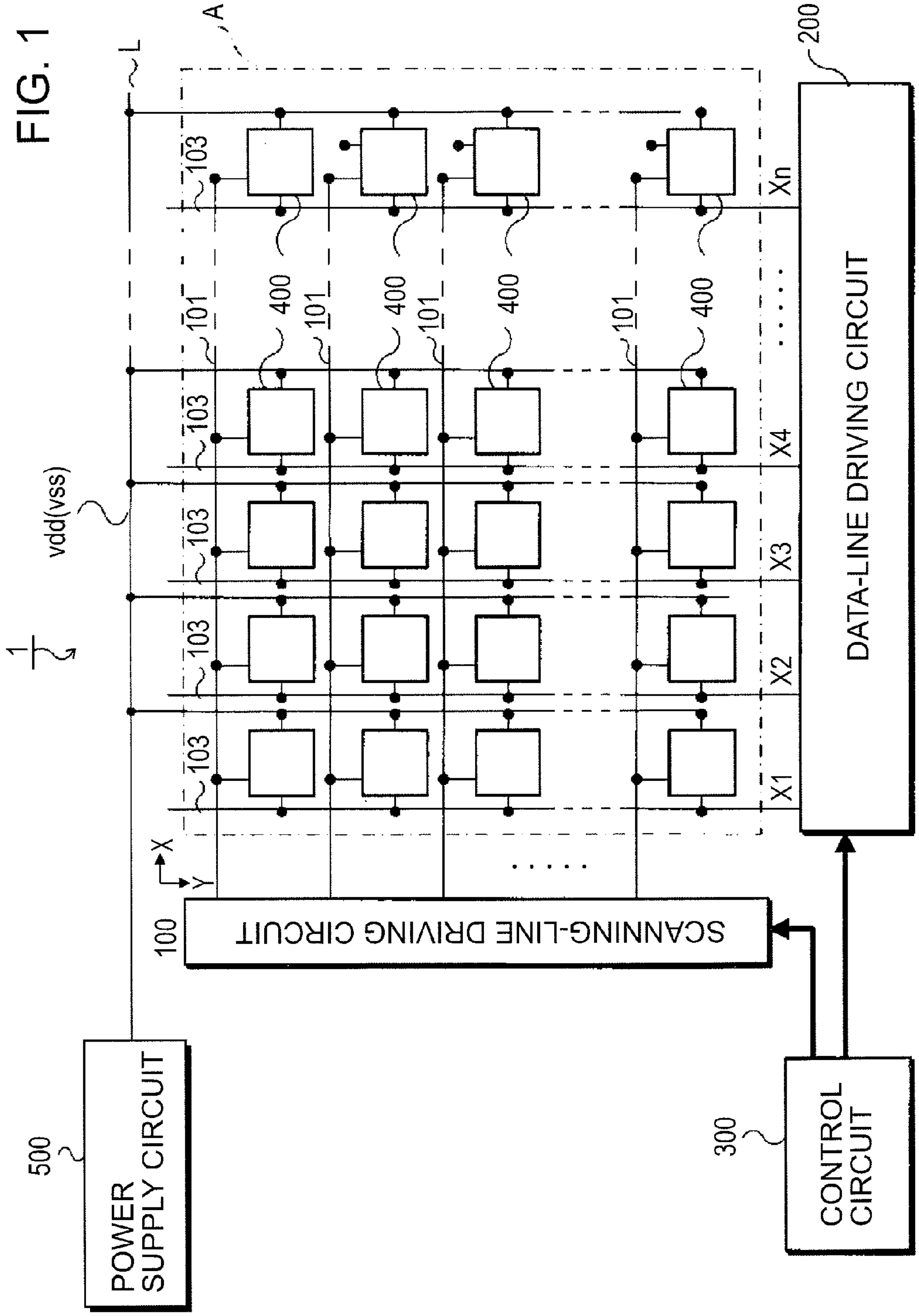
FIG. 1 is a block diagram illustrating a configuration of an electro-optical device according to a first embodiment of the present invention.
Figure 2:
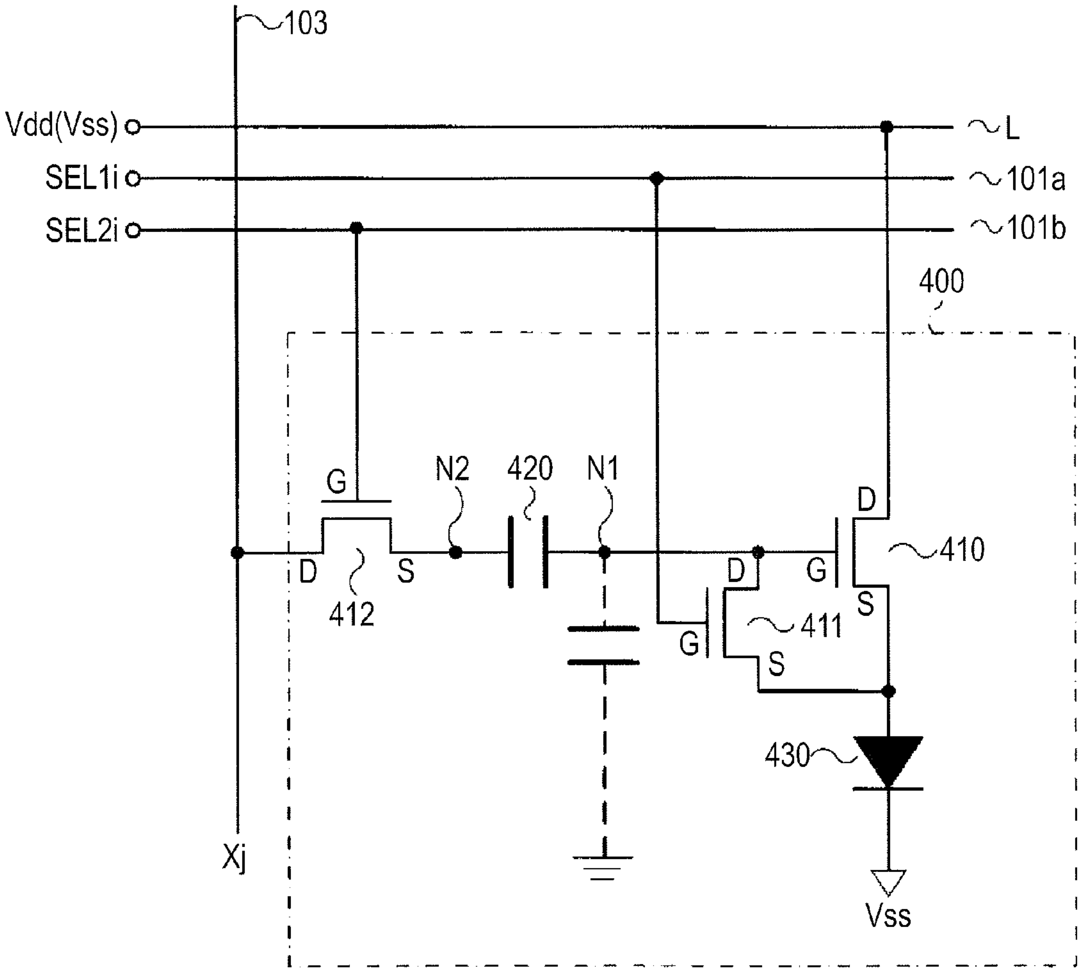
FIG. 2 is a diagram illustrating a pixel circuit of the electro-optical device.

FIG. 1 is a block diagram schematically illustrating a configuration of an electro-optical device according to an embodiment of the invention and FIG. 2 is a circuit diagram illustrating of a pixel circuit. As shown in FIG. 1, an electro-optical device 1 includes a display panel A, a scanning-line driving circuit 100, a data-line driving circuit 200, a control circuit 300, and a power supply circuit 500. Here, m (for example, m=360) scanning lines 101 are formed parallel to the X direction on the display panel A. Further, n (for example, n=480) data lines 103 are formed parallel to the Y direction perpendicular to the X direction. Pixel circuits 400 are disposed to correspond to intersections between the scanning lines 101 and the data lines 103, respectively. Each pixel circuit 400 includes an OLED element 430. Each pixel circuit 400 is supplied with a high potential Vdd or a low potential Vss as a source voltage through a power supply line L. All the pixel circuits 400 are connected in common to the low potential Vss of the power supply circuit 500. In the present embodiment, the low potential Vss is "0V."

Only the scanning lines 101 extend in the X direction in FIG. 1, but in the embodiment, each scanning line 101 includes a first control line 101*a* and a second control line 101*b* as shown in FIG. 2. Accordingly, one set of control lines 101*a* and 101*b* is used in common for the pixel circuits 400 in a row.

The scanning-line driving circuit 100 supplies a first control signal SEL1 to the first control line 101*a* and a second control signal SEL2 to the second control line 101*b* in a unit of rows. Specifically, the scanning-line driving circuit 100 selects one scanning line 101 every horizontal scanning period and supplies the first and second control signals to the first and second control lines 101*a* and 101*b* in response to the selection. The first control signal SEL1 supplied to the first control line 101*a* in row i is marked by SEL1*i* and the second control signal SEL2 supplied to the second control line 101*b* in row i is marked by SEL2*i*.

The data-line driving circuit 200 supplies data signals with a voltage corresponding to current (that is, a gray scale of a pixel), which should flow in an OLED element 430 of a pixel circuits 400, to the respective pixel circuits 400 in row 1 corresponding to the scanning lines 101 selected by the scanning-line driving circuit 100 through the data lines 103. Here, the data signal (data voltage) is specified so that a pixel becomes brighter as the voltage becomes higher and a pixel becomes darker as the voltage becomes lower. For the purpose of convenient description, the data signal supplied to the data line 103 in row j is denoted by Xj.

The control circuit 300 supplies clock signals (not shown) to the scanning-line driving circuit 100 and the data-line driving circuit 200 to control both circuits and supplies image data defining a gray scale of each pixel to the data-line driving circuit 200.

Next, the pixel circuit 400 will be described in detail with reference to FIG. 2. In the figure, the pixel circuit 400 corresponds to row i. As shown in FIG. 2, the pixel circuit 400 includes a driving transistor 410, n-channel transistors 411 and 412 serving as first and second switching elements, a capacitive element 420 having a first electrode, a dielectric layer, and a second electrode, and an OLED element 430 which is an electro-optical element. The driving transistor 410 is an n-channel amorphous silicon transistor. The transistors 411 and 412 are also amorphous silicon transistors, because they are formed in the same process as the driving transistor 410. the OLED element 430 is a light emitting element emitting light with brightness corresponding to forward current, in which a light emitting layer is made of an organic electroluminescent (EL) material corresponding to an emission color. In a process of forming the light emitting layer, an organic EL material is jetted as liquid droplets from an inkjet head and then is dried.

The drain electrode of the driving transistor 410 is connected to a power supply line L and is supplied with the high potential Vdd or the low potential Vss. The source electrode of the driving transistor 410 is connected to a positive electrode of the OLED element 430. A negative electrode of the OLED element 430 is connected to the low potential Vss. Accordingly, the OLED element 430 along with the driving transistor 410 is electrically interposed between the power supply line L and the low potential Vss. The negative electrode of the OLED element 430 is an electrode common to all the pixel circuits 400.

The gate electrode of the driving transistor 410 is connected to one end (first electrode) of the capacitive element 420 and the drain electrode of the transistor 411. For the purpose of convenient description, one end (the gate electrode of the driving transistor 410) of the capacitive element 420 is referred to as a node N1. As indicated by a dotted line in FIG. 2, a parasitic capacitor is formed in the node N1. The capacitor is a capacitor parasitic between the node N1 and the negative electrode of the OLED element 430 and includes gate capacitance of the driving transistor 410, capacitance of the OLED element 430, and parasitic capacitance between the node N1 and the negative electrode.

The source electrode of the transistor 411 is connected to the source electrode of the driving transistor 410 and the gate electrode of the transistor 411 is connected to the first control line 101*a*. That is, the gate electrode of the transistor 411 is supplied with the first control signal SEL1*i* through the first control line 101*a* and when the first control signal SEL1*i* is changed to a H level, the transistor 411 is turned on and thus the gate electrode and the source electrode of the driving transistor 410 are electrically connected to each other. In this state, the source electrode and the drain electrode of the driving transistor 410 forms an equivalent diode and the voltage therebetween becomes a threshold voltage Vth of the driving transistor 410.

The transistor 412 is interposed between the other end (second electrode) of the capacitive element 420 and the data line 103, wherein the source electrode is connected to the other end of the capacitive element 420 and the drain electrode is connected to the data line 103. The gate electrode of the transistor 412 is connected to the second control line 101*b*. That is, the gate electrode of the transistor 412 is supplied with the second control signal SEL2*i* through the second control line 101*b*. Accordingly, the transistor 412 is turned on when the second control signal SEL2*i* is changed to a H level, thereby applying the data signal (voltage) supplied through the data line 103 to the other end of the capacitive element 420. For the purpose of convenient description, the other end (the source electrode of the transistor 412) of the capacitive element 420 is referred to as a node N2.

Figure 3:
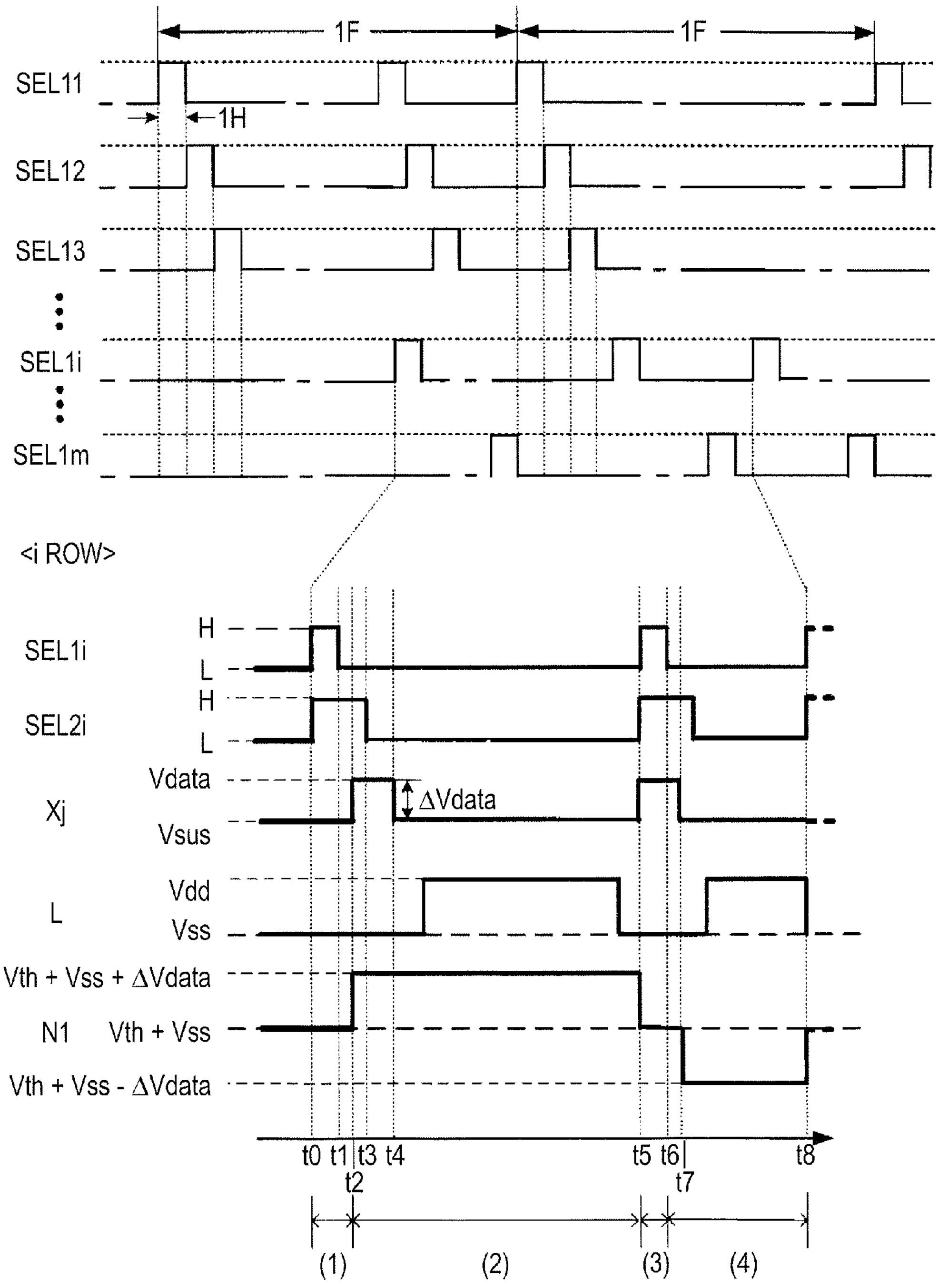
FIG. 3 is a timing chart illustrating operations of the electro-optical device.

Next, operations of the electro-optical device 1 will be described. FIG. 3 is a timing chart illustrating the operations of the electro-optical device 1.

First, as shown in FIG. 3, the scanning-line driving circuit 100 sequentially selects the scanning lines 101 in row 1, row 2, row 3, . . . , row m one by one every horizontal scanning period (1H) from the starting time of a vertical scanning period (1F) and sets only the scanning signal of the selected scanning line 101 to a H level and the scanning signals of the other scanning lines to a L level.

Here, an operation when the scanning line 101 in row i is selected and the scanning signal Yi is changed to the H level will be described with reference FIGS. 4 to 7 along with FIG. 3.

As shown in FIG. 3, the operation of the pixel circuit 400 corresponding to row i and column j can be approximately divided into four operations of an initialization period (1), a operation period (2), a reset period (3), and a recovery period (4).

Hereinafter, the operations of the periods will be sequentially described.

Figure 4:
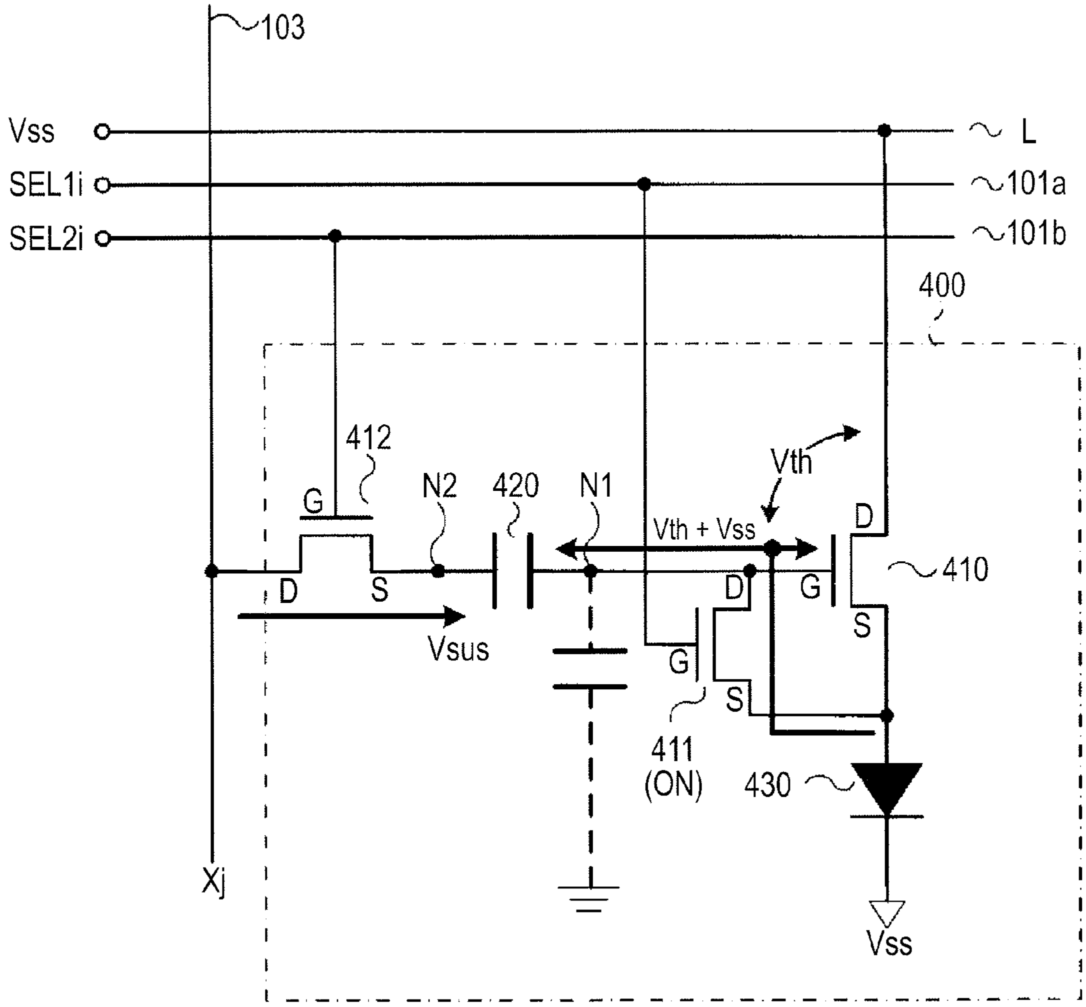
FIG. 4 is a diagram illustrating an operation of the pixel circuit.

The initialization period (1) is started from the time t0 when the first control signal SEL1*i* is changed to the H level and the preparation of a writing operation to the pixel circuit 400 is performed in the initialization period. Specifically, before the time t0, the first control signal SEL1*i* and the second control signal SEL2*i* are all in the L level. At the time t0, the scanning-line driving circuit 100 changes all the first control signal SEL1*i* and the second control signal SEL2*i* to the H level. Accordingly, in the pixel circuit 400, as shown in FIG. 4, the transistor 411 is turned on by the first control SEL1*i* with the H level. Accordingly, the gate electrode and the source electrode of the driving transistor 410 are electrically connected to each other and thus the driving transistor 410 serves as a diode. At this time, the potential of the node N1 is Vss+Vth. At the time t0, the transistor 412 is also turned on by the second control signal SEL2*i* with the H level. Accordingly, the node N2 which is the other end of the capacitive element 420 is connected to the data line 103 through the transistor 412 and the potential of the node N2 is changed to a reference potential Vsus (described later) of the data line 103.

Figure 5:
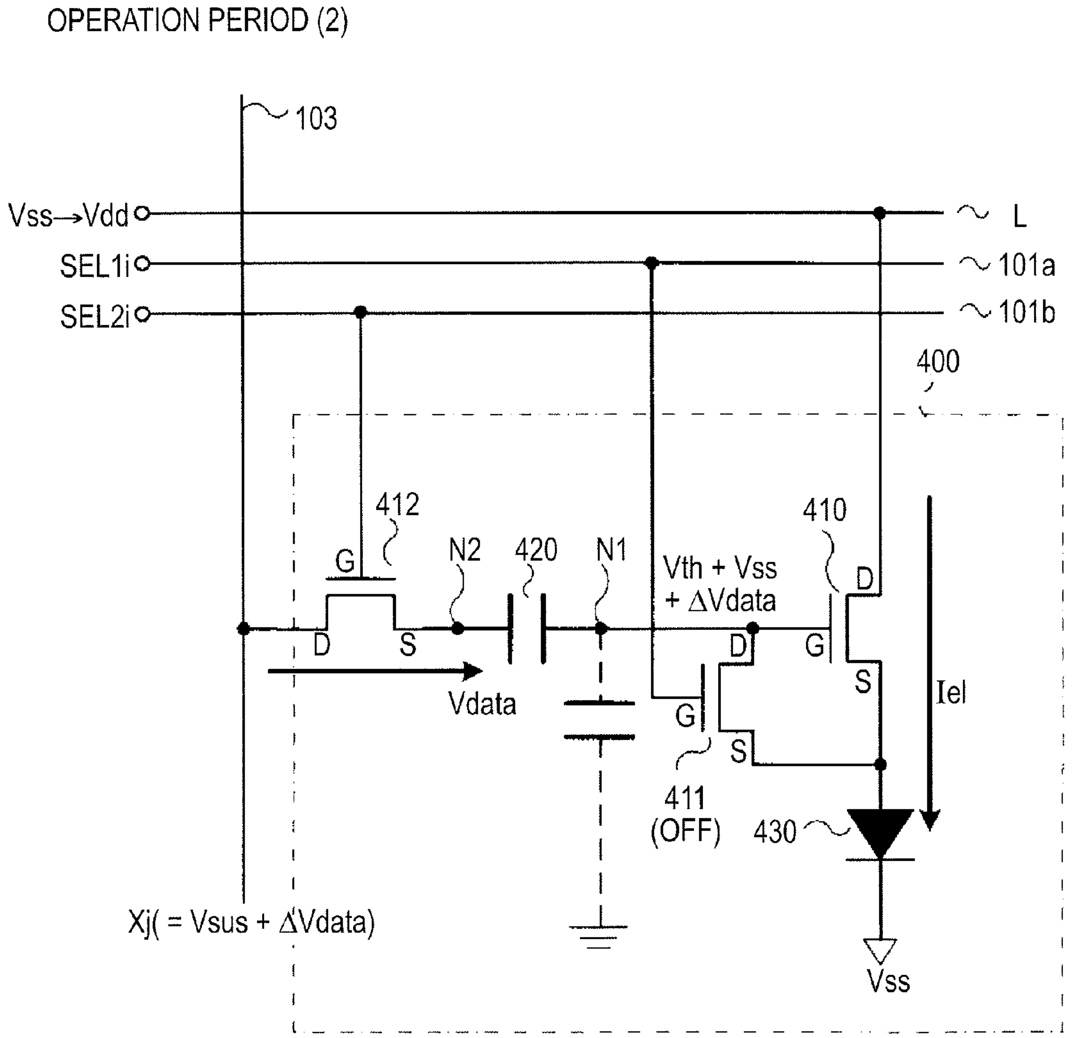
FIG. 5 is a diagram illustrating an operation of the pixel circuit.

In the operation period (2), the data signal Xj with a data voltage corresponding to a gray scale of the pixel in row i and column j is supplied to the corresponding pixel circuit 400 through the data line 103 and the corresponding OLED element 430 emits light with the brightness corresponding to the data voltage. Specifically, the scanning-line driving circuit 100 returns the first control signal SEL1*i* to the L level at the time t1 and maintains the second control signal SEL2*i* at the H level. Accordingly, as shown in FIG. 5, the transistor 411 is turned off and the node N1 is changed to a floating state.

At the time t2, the data-line driving circuit 200 supplies the data signal Xj with a voltage corresponding to the gray scale of the pixel in row i and column j to the data line 103 in column j. Specifically, the data signal Xj specifies the gray scale of the pixel by using the reference voltage Vsus as a reference and changing (increasing) the voltage by ΔVdata from the reference voltage Vsus. The operating voltage is Vsus+ΔVdata. When the pixel is specified in a black color with the lowest gray scale, ΔVdata is zero. As the pixel is specified in a gray scale corresponding to the higher brightness, ΔVdata is increased.

In this case, the potential of the node N2 which is the other end of the capacitive element 420 increases by ΔVdata in response to the variation in potential of the data signal Xj. At the time t3, the scanning-line driving circuit 100 returns the second control signal SEL2*i* to the L level to turn off the transistor 412. Thereafter, at the time t4, the level of the data signal Xj is returned to the reference potential Vsus.

At the time t3, since the transistor 411 and the transistor 412 are all turned off, the potential of the node N1 is held only by the gate capacitance of the driving transistor 410. Accordingly, the voltage of the node N1 increases from the potential of the initialization period (1) by the amount which is obtained by dividing the voltage variation ΔVdata by the capacitance ratio of the capacitive element 420 and the gate capacitance of the driving transistor 410.

Specifically, when the capacitance of the capacitive element 420 is Ca and the gate capacitance of the driving transistor 410 is Cb, the node N1 increases fro the low potential Vss (=0V) by (ΔVdata·Ca/(Ca+Cb)). Generally, since the gate capacitance Cb of the driving transistor 410 is negligibly smaller than the capacitance Ca of the capacitive element 420 and ΔVdata·Ca/(Ca+Cb)≅ΔVdata can be considered, the voltage of the node N1 increases from the Vth+Vss by ΔVdata and finally is Vdata'(≈Vth+Vss+ΔVdata).

When the high potential Vdd is supplied through the power supply line L, the driving transistor 410 is turned on by the potential Vdata' held in the node N1. Then, the positive electrode of the OLED element 430 is connected to the power supply line L and the current Tel corresponding to the voltage of the node N1 flows therein. As a result, the OLED element 430 continuously emits light with the brightness corresponding to the current Tel.

Here, the current Tel flowing in the OLED element 430 can be expressed by the following expression (A), where the ON voltage of the OLED element 430 is Von:

$$Iel=1/2\beta(Vgs-Vth)^2$$

$$Iel=1/2\beta[\{(Vth+Vss+\Delta V\text{data})-(Vss+V\text{on})\}-Vth]^2$$

$$Iel=1/2\beta(\Delta V\text{data}-V\text{on})^2 \quad (A)$$

That is, the current Iel does not depend on the threshold voltage Vth of the driving transistor 410. Accordingly, even when the threshold voltages Vth of the driving transistors used for a plurality of pixel circuits 400 are not uniform, it is possible to display an image with uniform brightness. On the other hand, when the gate capacitance Cb of the driving transistor 410 is not negligible with respect to the capacitance of the capacitive element 420, the voltage of the node N1 is Vdata'=Vss+(ΔVdata·Ca/(Ca+Cb)), which means that the voltage decreases by the gate capacitance Cb. Accordingly, in this case, it is preferable that the data signal Xj with a voltage corrected in advance by the gate capacitance Cb is supplied.

Figure 6:
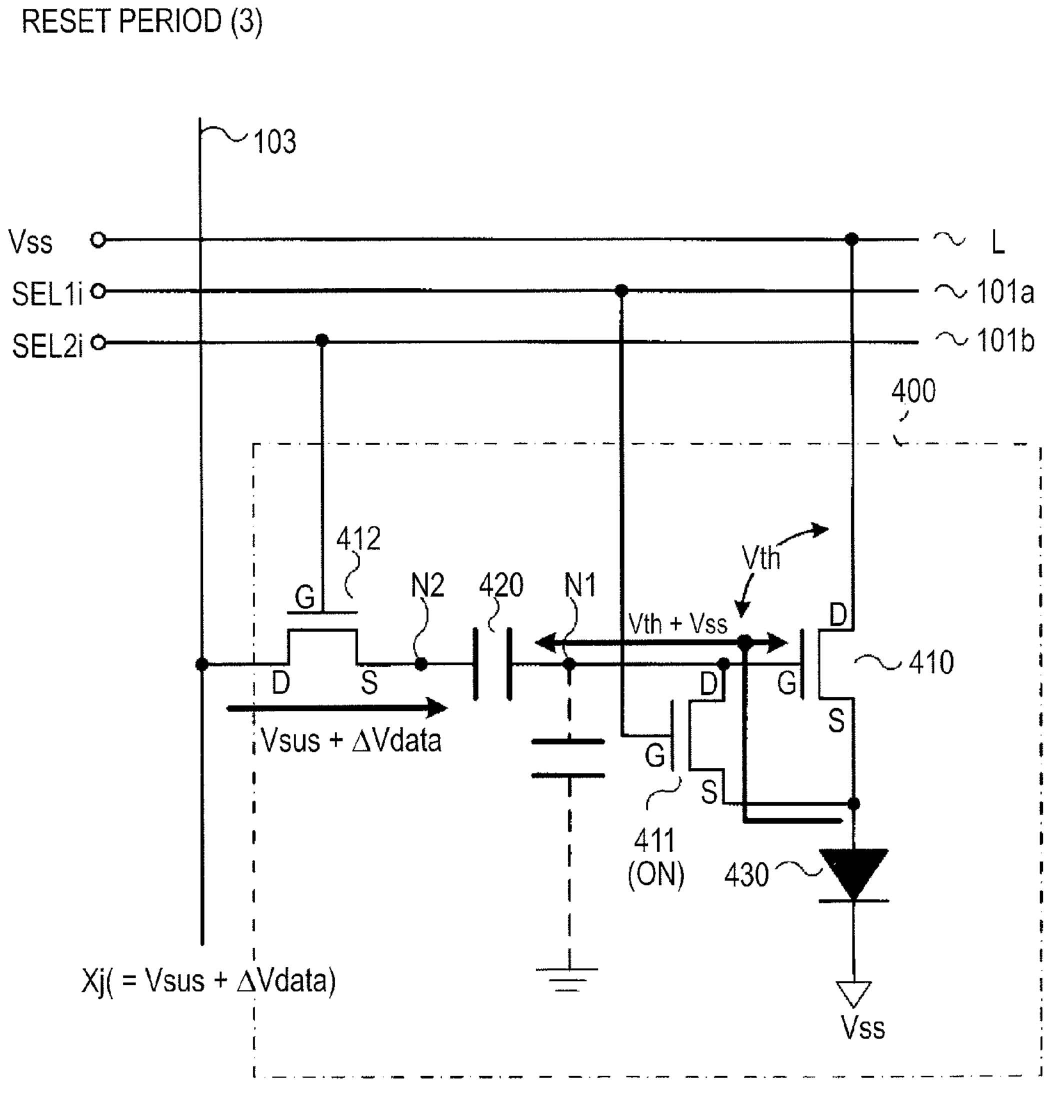
FIG. 6 is a diagram illustrating an operation of the pixel circuit.

In the reset period (3) subsequent to the operation period (2), the scanning-line driving circuit 100 changes the first control signal SEL1$i$ and the second control signal SEL2$i$ to the H level at the time t5. Accordingly, as shown in FIG. 6, the transistor 411 is turned on and thus the potential of the node N1 which is one end of the capacitive element 420 is reset. The transistor 412 is turned by the second control signal SEL2$i$ with the H level and thus the node N2 which is the other end of the capacitive element 420 is connected to the data line 103.

At the time t5 when the reset period (3) is started, the data-line driving circuit 200 supplies the data signal Xj with the potential, which is increased from the reference voltage Vsus by ΔVdata, to the data line 103 in column j. At this time, the voltage of the node N2 increases by ΔVdata in response to the voltage variation of the data signal Xj. As a result, a potential difference of (Vsus+ΔVdata)−(Vth+Vss) is generated between the node N1 and the node N2.

Figure 7:
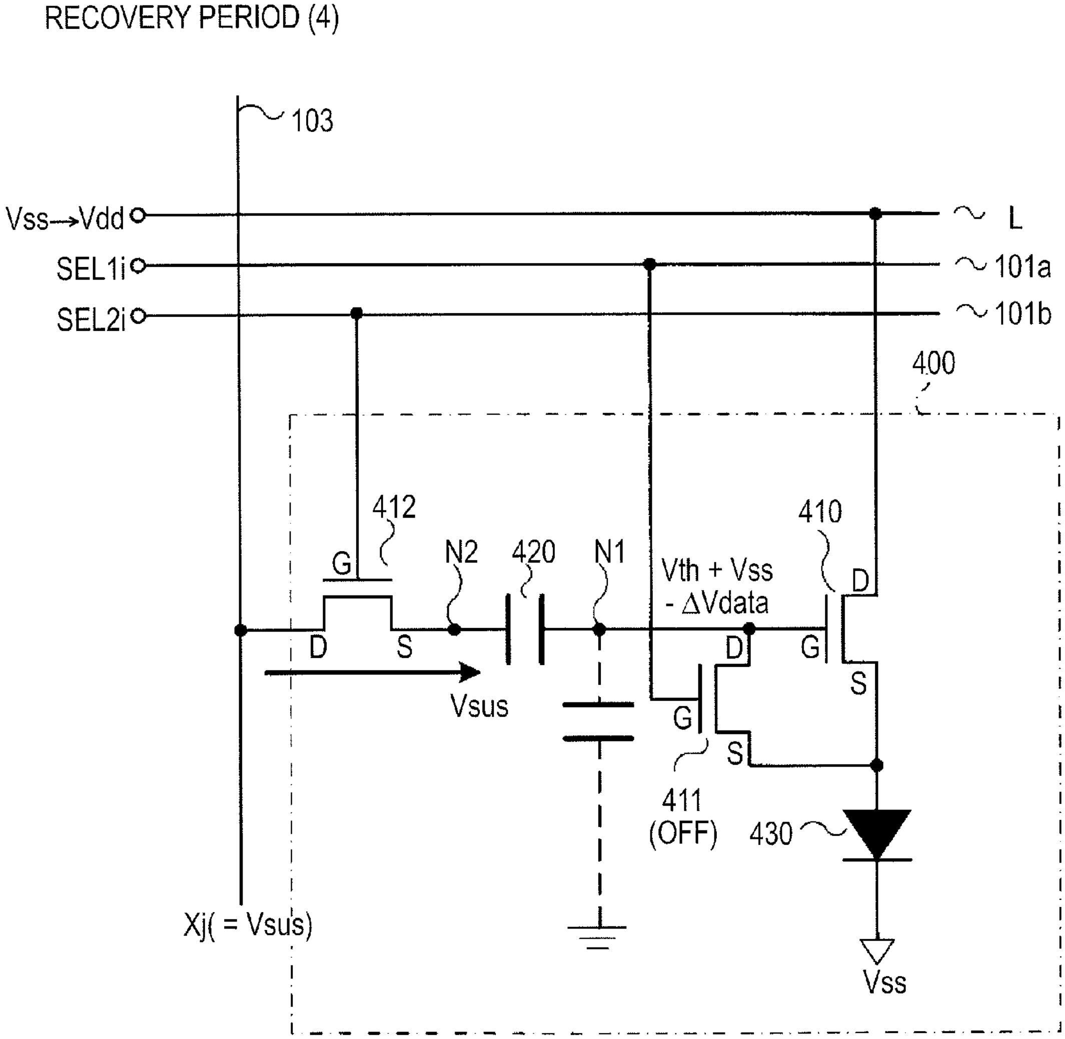
FIG. 7 is a diagram illustrating an operation of the pixel circuit.

In the recovery period (4) subsequent to the reset period (3), the potential of the node N1 is a negative potential with respect to Vth+Vss and a reverse bias voltage is applied to the gate electrode of the driving transistor 410. Specifically, at the time t6, the scanning-line driving circuit 100 returns the first control signal SEL1$i$ to the L level and maintains the second control signal SEL2$i$ at the H level. Accordingly, as shown in FIG. 7, the transistor 411 is turned off and the node N1 is in the floating state. The transistor 412 is turned on and the node N2 is connected to the data line 103. In this state, the data signal Xj with the data voltage of (Vsus+ΔVdata) is continuously supplied through the data line 103. The potential difference between the node N1 and the node N2 is maintained in (Vsus+ΔVdata)−(Vth+Vss).

At the time t7, the data-line driving circuit 200 decreases the data voltage of the data signal Xj by ΔVdata to the reference potential Vsus. As a result, the voltage of the node N2 which is the other end of the capacitive element 420 drops by ΔVdata. At this time, the potential difference of (Vsus+ΔVdata)−(Vth+Vss) is held between the node N1 and the node N2. since the node N1 is in the floating state, the voltage of the node N1 drops by the voltage drop of the node N2 and the potential consequently becomes (Vth+Vss)−ΔVdata. Accordingly, a negative voltage is applied to the gate electrode of the driving transistor 410. The reset period (3) is maintained to the time t8 of the next vertical scanning period (1F) when the scanning line 101 in row i is selected and the first control signal SEL1$i$ is changed to the H level and the negative voltage is continuously applied to the driving transistor 410 in the meantime. At the time t8, the initialization period (1), the emission period (2), the reset period (3), and the recovery period (4) are repeated in the pixel circuits 400.

On the other hand, the lengths of the initialization period (1), the operation period (2), the reset period (3), and the recovery period (4) can be set properly. Specifically, by setting the length of the emission period (3) longer, the entire screen can be brighter and by setting the length of the emission period shorter, the entire screen can be darker.

Although row i has been concentrically described, the same is true of the pixel circuits 400 in the other rows. That is, in the period of time from the time when the scanning line 101 is selected and the scanning signal is changed to the H level to the time when the scanning line 101 is selected and the scanning signal is changed to the H level in the next vertical scanning period (1F), a series of operations of the initialization period (1), the operation period (2), the reset period (3), and the recovery period (4) are performed.

In the past, the low-temperature polysilicon (LTPS) transistor was used as the driving transistor 410 for driving the OLED element 430, but in recent years, the amorphous silicon transistor attracted attentions as the driving transistor, because it can be manufactured with low cost and can accomplish uniform characteristic. However, when a voltage having the same polarity such as a positive voltage or a negative voltage is continuously applied to a gate electrode of an amorphous silicon transistor, it is known that the threshold voltage thereof varies. The brightness of the corresponding OLED element 430 varies due to the variation in threshold voltage, thereby deteriorating display quality. On the contrary, in the embodiment described above, since a positive voltage is applied to the gate electrode of the driving transistor 410 in the operation period and a negative voltage is applied thereto in the recovery period, the variation in threshold voltage of the driving transistor 410 can be greatly suppressed even when the amorphous silicon transistor is used as the driving transistor 410. Accordingly, it is possible to prevent variation in emission brightness of the OLED element 430 and to accomplish high display quality. When carriers are continuously supplied to other kinds of transistors such as the low-temperature polysilicon transistors, the characteristics vary due to influence of the accumulated carriers, similarly to the amorphous silicon transistors. Accordingly, even when the low-temperature polysilicon transistor is used as the driving transistor 410, the above-mentioned embodiment is useful.

According to the embodiment described above, it is possible to suppress the variation in characteristics of the driving transistor 410 by applying the negative voltage to the gate electrode (node N1) of the driving transistor 410 with a simple circuit configuration in which two transistors 411 and 412 and one capacitive element 420 are combined. In addition, since the number of elements such as transistors and capacitors constituting the pixel circuit 400 can be reduced and the area of the elements occupying the pixel circuit 400 can be reduced, it is possible to keep the aperture ratio desirable.

Since the negative voltage can be applied to the gate electrode of the driving transistor 410 by allowing the data-line driving circuit 200 to supply the data signal Xj with the positive voltage to the data line 103 in the reset period (3), it is not necessary to externally supply the negative voltage to the corresponding driving transistor 410 and thus it is not necessary to widen the dynamic voltage range of the electro-optical device 1. As a result, it is possible to facilitate the circuit design and to suppress the power consumption.

Since the signal with the same voltage as supplied to the data line 103 in the operation period (2) is supplied from the date-line driving circuit 200 in the reset period (3), the negative voltage with the same magnitude as the voltage (Vdata') supplied in the operation period (2) can be continuously applied to the gate electrode (node N1) of the driving transistor 410 in the recovery period (4). Accordingly, it is possible to more effectively suppress the variation in characteristics of the driving transistor 410.

On the other hand, the OLED element 430 includes an organic light emitting material such as low-molecular molecules, high-molecular molecules, and dendrimer. Instead of the OLED element 430 which is an example of a current driven element, a light emitting element such as an inorganic EL element, a field emission (FE) element, a surface-conduction emission (SE) element, a ballistic electron emission (BS) element, and an LED element, an electrophoresis element, and an electro-chromic element may be used. The invention can applied to an electro-optical device used for a printing head of an optical printer or an electronic copier display device employing light emitting diodes, similarly to the above-mentioned embodiment.

The invention can be applied to a device having a unit circuit in which an amorphous transistor is used as a driving transistor of a driven element. For example, the invention can be applied to a sensing device of a bio chip or the like. Here, the unit circuit corresponds to the pixel circuit 400 and a variety of driven elements are provided instead of the OLED.

Figure 8:
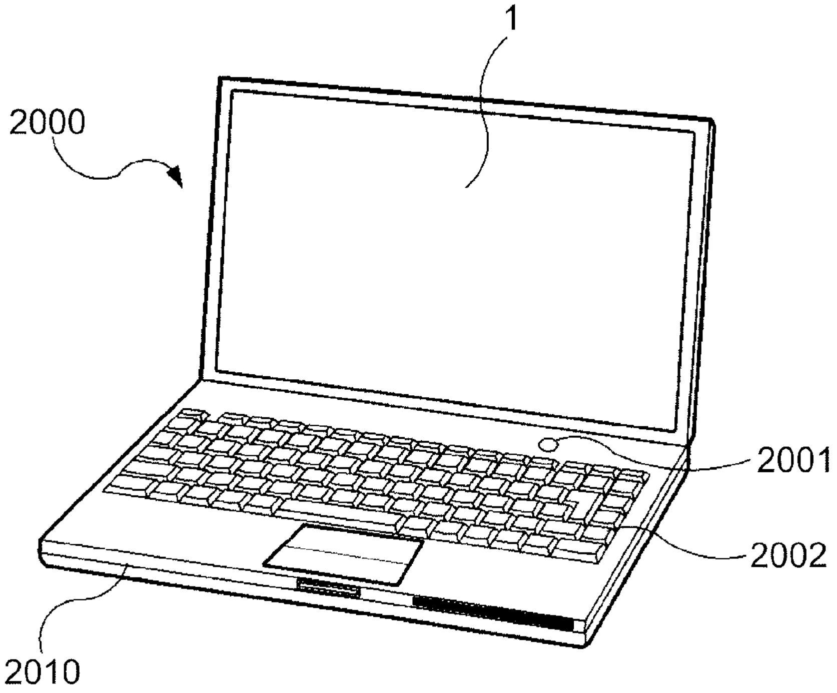
FIG. 8 is a diagram illustrating a personal computer employing the electro-optical device.

Hereinafter, an electronic apparatus employing the electro-optical device 1 according to the above-mentioned embodiment will be described. FIG. 8 shows a configuration of a mobile personal computer employing the electro-optical device 1. The personal computer 2000 includes the electro-optical device 1 as a display unit and a main body unit 2010. The main body unit 2010 includes a power switch 2001 and a keyboard 2002. Since the electro-optical device 1 employs the OLED elements 430, it is possible to provide a screen easy to watch with a wide viewing angle.

Figure 9:
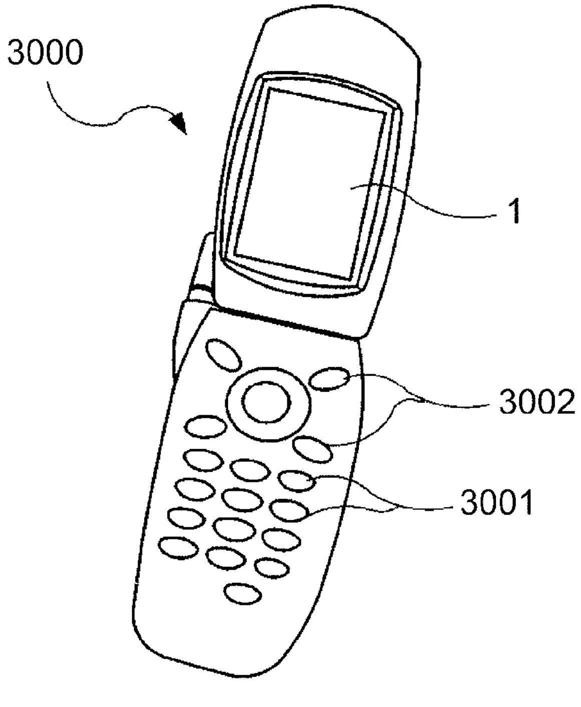
FIG. 9 is a diagram illustrating a mobile phone employing the electro-optical device.

FIG. 9 shows a configuration of a mobile phone employing the electro-optical device 1. The mobile phone 3000 includes a plurality of manipulation buttons 3001, scroll buttons 3002, and the electro-optical device 1 as a display unit. A picture displayed on the electro-optical device 1 is scrolled by manipulating the scroll buttons 3002.

Figure 10:
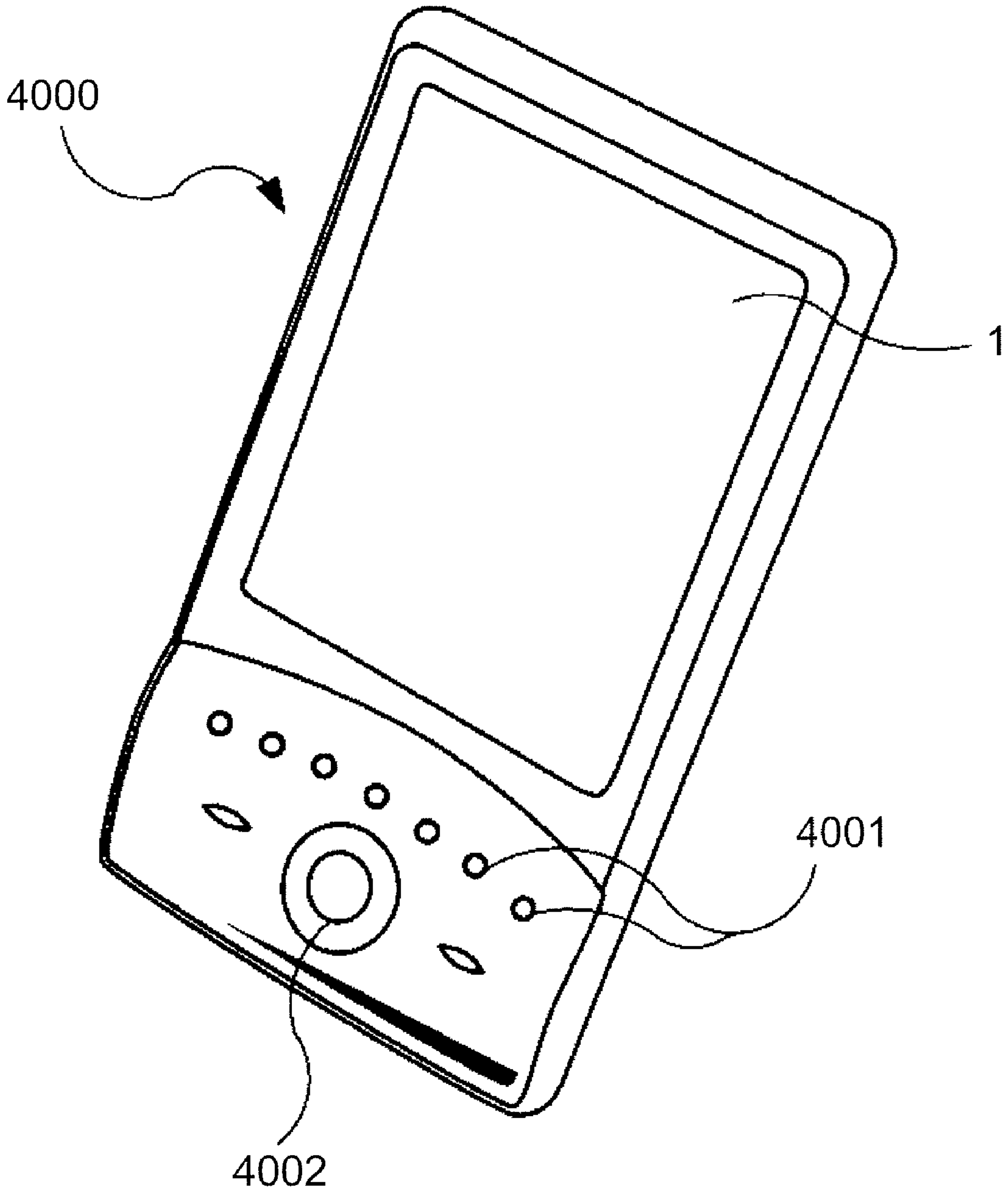
FIG. 10 is a diagram illustrating a personal digital assistant employing the electro-optical device.

FIG. 10 shows a configuration of a personal digital assistant (PDA) employing the electro-optical device. The personal digital assistant 4000 includes a plurality of manipulation buttons 4001, a power switch 4002, and the electro-optical device 1 as a display unit. A variety of information such as an address list and a schedule note is displayed on the electro-optical device 1 by manipulating the power switch 4002.

On the other hand, in addition to those shown in FIGS. 8 to 10, examples of the electronic apparatus employing the electro-optical device 1 can include a digital still camera, a liquid crystal television, a view finder type or monitor direct vision-type video tape recorder, a car navigation apparatus, a pager, an electronic pocket book, an electronic calculator, a word processor, a work station, a television phone, a POS terminal, an apparatus having a touch panel, and the like. The electro-optical device 1 can be used as a display unit of the electronic apparatuses. The electro-optical device may be used as a light source of a printing machine for indirectly forming images or letters by irradiating light to a photosensitive substance, not limited to the display unit of the electronic apparatuses for directly displaying images or letters.

What is claimed is:

1. A light-emitting device, comprising:
- a scanning line;
- a data line;
- a pixel circuit arranged corresponding to an intersection of the scanning line and the data line; and
- a power source line,
- the pixel circuit including:
  - a light-emitting element;
  - a driving transistor connected between the power source line and the light-emitting element;
  - a first switching transistor connected to the data line;
  - a second switching transistor connected between a gate and a source of the driving transistor; and
  - a capacitance connected between the first switching transistor and the gate of the driving transistor,
  - during a first period, the first and second switching transistors being turned on, and a reference potential being supplied to the data line; and
  - during a second period, the first switching transistor being turned on, and the second switching transistor being turned off, and a data potential corresponding to light-emitting brightness of the light-emitting element being supplied to the data line, and a potential of the power source line being at a low level; and
  - during a third period after the second period, the first and second switching transistors being turned on and the data potential being supplied to the data line, and a potential of the power source line being at the low level.

2. The light-emitting device as set forth in claim 1,
- during the first period, the potential of the power source line being at the low level.

3. The light-emitting device as set forth in claim 1,
- during a fourth period between the second period and the third period, the potential of the power source line being at a high level; and
- during the fourth period, the light-emitting element emitting light according to the data potential.

4. The light-emitting device as set forth in claim 1,
- during a fifth period after the third period, the first switching transistor being turned on, and the second switching transistor being turned off, the reference potential being supplied to the data line, and the potential of the power source line being at the low level.

5. The light-emitting device as set forth in claim 4,
- during a sixth period after the fifth period, the first and second switching transistors being turned off, and the potential of the power source line being at the high level.

6. An electronic apparatus comprising the light-emitting device as set forth in claim 1.

* * * * *